United States Patent [19]

Crowe et al.

[11] Patent Number: 5,050,935
[45] Date of Patent: Sep. 24, 1991

[54] SPACER FOR TRACK-ADJUSTABLE WHEEL

[75] Inventors: Terence R. Crowe, Shrewsbury, England; John Sayer, Bridgnorth, England

[73] Assignee: GKN Sankey Limited, Shropshire, England

[21] Appl. No.: 627,262

[22] Filed: Dec. 14, 1990

[30] Foreign Application Priority Data

Aug. 10, 1990 [GB] United Kingdom ................ 9017571

[51] Int. Cl.$^5$ ............................................. B60B 23/12
[52] U.S. Cl. ................................ 301/9 TV; 301/10 R
[58] Field of Search ................ 301/9 R, 9 DN, 9 TV, 301/13 SM, 36 R, 13 R, 10 R

[56] References Cited

FOREIGN PATENT DOCUMENTS 270493   1/1930  Italy .................................. 301/9 TV
533996   2/1941  United Kingdom ............ 301/9 TV
2167717  6/1986  United Kingdom ............ 301/9 TV Primary Examiner—Russell D. Stormer
Attorney, Agent, or Firm—Marshall, O'Toole, Gerstein, Murray & Bicknell

[57] ABSTRACT

The spacer (2) is for use in spacing a disc from attachment portions of the rim of the wheel. The spacer comprises two spacing portions (4,6) and a rigid joining portion (22) retaining the spacing portions at a constant distance and orientation with respect to each other. The spacing portions (4,6) each have a bolt-receiving passage (24) and bearing surfaces (8,10) extending around the mouths of the passage. The bearing surfaces (8,10) of each spacing portion are in parallel planes which are the same planes for both spacing portions.

10 Claims, 1 Drawing Sheet

SPACER FOR TRACK-ADJUSTABLE WHEEL

BACKGROUND OF THE INVENTION

1. Field of the Invention

This invention is concerned with a spacer for use in spacing a disc of a track-adjustable wheel from attachment means of a rim of the wheel to which the disc is bolted.

Track-adjustable wheels are frequently utilised on agricultural tractors and other vehicles to enable the track to be adjusted to suit particular requirements. Such wheels comprise a rim on which a tire is mounted, the rim having attachment means, normally in the form of lugs, welded thereto, and a disc which is bolted to the attachment means of the rim and is also secured to a hub of the tractor. The disc is bowed so that two positions of adjustment can be achieved by securing the disc one way round or the other. The disc can also be attached to either side of the attachment means so that the adjustment possibilities reaches four. Furthermore, the rim itself can be reversed doubling the possibilities to make a total of eight possible adjustment positions. In a conventional wheel, the lugs are of sufficient extent transversely of the wheel that the attachment of the disc to one side or the other thereof gives a considerable variation in the track.

In the specification of British Patent No. 2 167 717, a track-adjustable wheel is described in which, instead of lugs, the attachment means of the rim comprises a ring welded continuously to the rim around an outer circumference of the ring. This ring is planar and relatively thin so that only a small track-adjustment can be achieved by altering the side to which the disc is bolted. To provide a greater variation, spacers are introduced between the ring and the disc, the spacers each having a bolt-receiving passage therethrough and a first bearing surface which extends around a mouth at one end of the passage and a second bearing surface which extends around a mouth at the opposite end of the passage. One of these bearing surfaces rests against the ring while the other rests against the disc. In one way of assembling the track-adjustable wheel described in the above-mentioned British Patent Specification No. 2 167 717, the rim is placed horizontally, the spacers are positioned on the upper surface of the ring so that the bolt-receiving passage of each spacer is aligned with a bolt-receiving passage in the ring, the disc is positioned on top of the spacers so that bolt-receiving passages in the disc are aligned with the bolt-receiving passages of the spacers, and bolts are inserted so that each extends through a bolt receiving passage in the ring, a spacer and the disc. Nuts are then tightened on to the bolts and the wheel can then be mounted on the hub of a tractor. However, because in some cases there is only a small clearance between the rim and the bolt-receiving passage of the ring, there being a weld present at the junction of the ring with the rim, and because of the necessity to provide the spacer with bearing surfaces of sufficient size to carry the load required, it is necessary that the spacers are not axi-symmetric so that they need to be in one of a number of specific orientations when the bolts are tightened. However, it is found that the orientation of the spacers is liable to alter during the above-described assembly process with a consequent danger that when the bolts are tightened the spacers may not be correctly seated against the ring and the disc. For example, a spacer may foul the weld between the ring and the rim so that although the bolts may be tight, the spacing between the ring and the disc may not be constant around the wheel.

It is an object of the present invention to provide a spacer for use in spacing a disc of a track-adjustable wheel from attachment means of a rim of the wheel to which the disc is bolted, the spacer avoiding the possibility of the orientation of the spacer altering during the assembly of the wheel.

SUMMARY OF THE INVENTION

The invention provides a spacer for use in spacing a disc of a track-adjustable wheel from attachment means of a rim of the wheel to which the disc is bolted, the spacer comprising a first spacing portion, a second spacing portion, and a rigid joining portion rigidly joined to both spacing portions and serving to retain the spacing portions at a constant distance and orientation with respect to each other, each spacing portion having a bolt-receiving passage therethrough and each spacing portion having a first bearing surface which extends around a mouth at one end of the passage and a second bearing surface which extends around a mouth at the opposite end of the passage, wherein the first bearing surfaces of both spacing portions lie in a first plane, the second bearing surfaces of both spacing portions lie in a second plane, and the first and second planes are parallel to one another.

A spacer according to the invention replaces two of the conventional spacers by its separate spacing portions. The orientation of the two spacer portions is determined by the joining portion so that, when bolts are received in the bolt-receiving passages of the two spacing portions, it is not possible for the spacing portions to be other than in the correct orientation. A spacer according to the invention is also much easier to handle than the conventional spacers and only half as many are required per wheel. It is not necessary for the bolt-receiving passage of a spacing portion completely to surround a bolt, i.e. the passage may be in the form of a slot, provided that the spacer is retained in position by the bolts. Furthermore, the bearing surfaces of the spacing portions do not need completely to surround the mouths of the passage so long as sufficient surface is provided distributed around the mouths to sustain the loads when the bolts are tightened.

A spacer according to the invention finds particular utility with a wheel as described in the above-mentioned British Patent Specification No. 2 167 717 but can also be utilised with wheels of other designs Preferably, a side surface of each spacing portion is shaped to conform approximately to a surface of the rim. For example, the side surface may be arcuate about the same centre of curvature as the rim. Alternatively, a side surface of each spacing portion may extend generally parallel to a tangent to the rim at a point adjacent to the spacing portion when the spacer is in position. At least one bearing surface of the spacing portion may be joined to the side surface by an inclined surface, thereby providing additional clearance, e.g. for the weld between the ring and the rim.

In order to reduce the possibility that the spacer will be inserted the wrong way round, a spacer according to the invention may be given one, two or three degrees of symmetry. For example, the spacer may be symmetrical about a plane passing longitudinally through the centre of both passages, or may be symmetrical about a plane extending normally to said first and second planes equidistant from the two spacing portions, or may be symmetrical about a plane extending parallel to and equidistant from said first and second planes.

BRIEF DESCRIPTION OF THE DRAWINGS

An illustrative embodiment of the invention is described hereinafter in detail with reference to the accompanying drawings.

In the drawings.

DESCRIPTION OF PREFERRED EMBODIMENT

Figure 1:
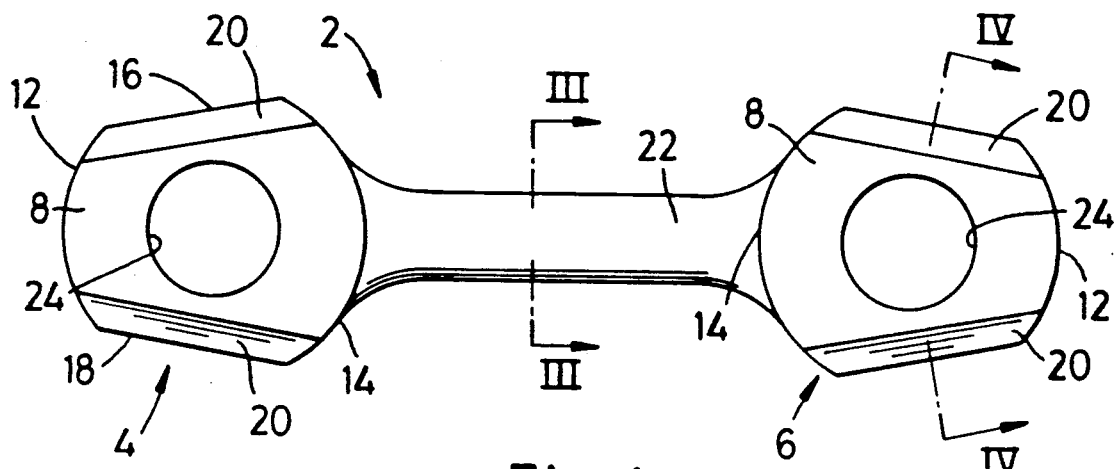
FIG. 1 is a plan view of the illustrative spacer.

The illustrative spacer 2 shown in the drawings is for use in spacing a disc of a track-adjustable wheel from attachment means of a rim of the wheel to which the disc is bolted. The spacer 2 comprises a first spacing portion 4 and a second spacing portion 6. The two spacing portions 4 and 6 are identical to each other (although inverted with respect to each other) and the same reference numbers are used herein to refer to identical parts of both spacing portions with only the spacing portion 4 being described hereinafter in detail.

The first spacing portion 4 is bounded by a first bearing surface 8, a second bearing surface 10, a first arcuate end surface 12, a second arcuate end surface 14, a first side surface 16, a second side surface 18, and four inclined surfaces 20. The first bearing surface 8 lies in a first plane at one extreme of the first spacing portion 4 while the second bearing surface 10 lies in a second plane, parallel to the first plane, at the opposite extreme of the portion 4. The first and second arcuate end surfaces 12 and 14 are at opposite extremes of the spacing portion 4, with the surface 12 joining ends of the surfaces 8 and 10 together and the surface 14 joining opposite ends of the surfaces 8 and 10 together. The side surfaces 16 and 18 extend in planes which are normal to the first and second planes aforementioned. The side surfaces 16 and 18 join the arcuate end surfaces 12 and 14 on opposite sides of the first spacing portion 4. The surfaces 16 and 18 are inclined to one another so that the arcuate end surface 12 is shorter than the arcuate end surface 14. Opposite edges of the bearing surfaces 8 and 10 are joined to the side surfaces 16 and 18 by the inclined surfaces 20. Each inclined surface 20 meets one of the surfaces 8 and 10 at an angle and also one of the side surfaces 16 and 18 at an angle. The inclined surfaces 20 also join the arcuate surfaces 12 and 14.

Since the side surfaces 16 and 18 are inclined at an angle to one another they are each inclined at half this angle to the centre line of the spacing portion 4. This angle is selected so that the side surface 16 or 18 extends generally parallel to a tangent to the rim of a wheel at a point adjacent to the spacing portion 4 when the spacer 2 is in position on the track adjustable wheel. The angle is selected in accordance with the diameter of the rim and the spacing of the bolt-receiving passages in the ring and the disc. This enables the side surface to conform to the general direction of the rim. The presence of the inclined surfaces 20 provides a generally triangular, in cross-section, space which is useful in providing extra clearance for welds.

The first bearing surfaces 8 of the spacing portions 4 and 6 both lie in the same plane (the first plane aforementioned) and the second bearing surfaces 10 of both spacing portions 4 and 6 lie also in the same plane (the second plane aforementioned).

Each of the spacing portions 4 and 6 has a bolt-receiving passage 24 therethrough. The first bearing surface 8 of the portion 4 or 6 extends around a mouth at one end of the passage 24 and the second bearing surface 10 extends around a mouth at the opposite end of the passage 24.

The spacer 2 also comprises a rigid joining portion 22 which is in the form of a straight bar. In an alternative construction, the joining portion could be in the form of two or more bars and it is not essential that the joining portion is straight. The joining portion 22 is rigidly joined to both spacing portions 4 and 6 and serves to retain the spacing portions at a constant distance and orientation with respect to each other. Opposite ends of the joining portion 22 are rigidly attached centrally to the longer arcuate end surfaces 14 of the first and second spacing portions 4 and 6. In this case, the spacer 2 is made as a single casting so that the portions 4, 6 and 22 are integral. The joining portion 22 is contained between the first and the second planes in which the surfaces 8 and 10 lie so that the joining portion 22 will not foul a disc or a ring of a wheel. The spacer 2 is made of a material, in this case cast iron, which is strong in compression, non-flexible and will not creep under load.

Figure 2:
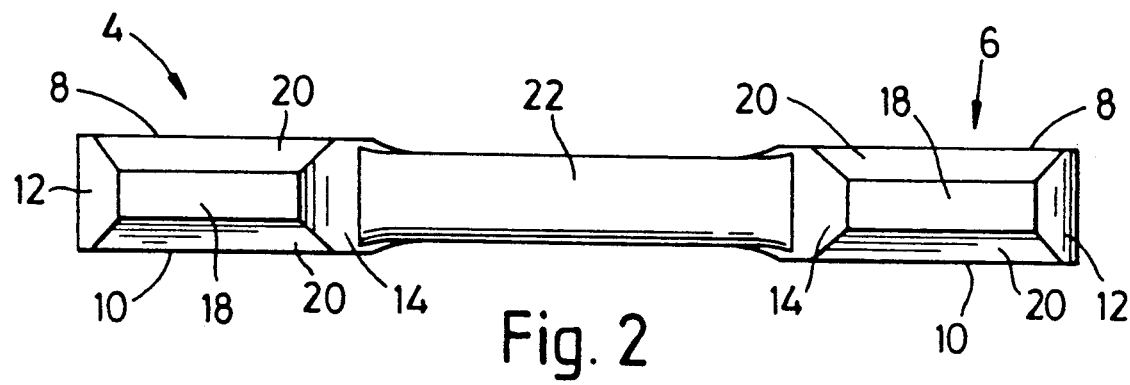
FIG. 2 is a side elevational view of the illustrative spacer.
Figure 3:
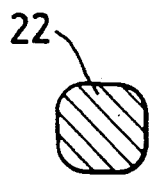
FIG. 3 is a cross-sectional view taken on the line III—III in FIG. 1.
Figure 4:
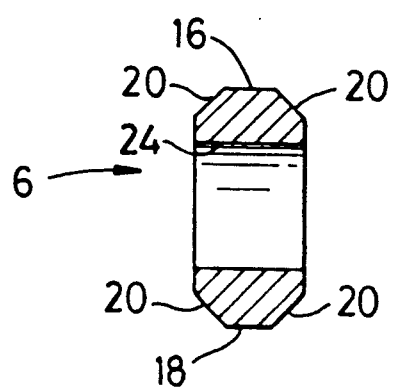
FIG. 4 is a cross-sectional view taken on the line IV—IV in FIG. 1.

As should be apparent from the above description and the drawings, the spacer 2 is symmetrical in three ways. Firstly, the spacer 2 is symmetrical about a plane passing longitudinally through the centre of both passages 24, i.e. a plane extending from left to right and out of the paper viewing FIG. 1. Secondly, the spacer 2 is symmetrical about a plane extending normally to said first and second planes equi-distant from the two spacing portions 4 and 6, i.e. a plane extending from top to bottom and out of the paper viewing FIG. 1. Thirdly, the spacer 2 is symmetrical about a plane extending parallel to and equi-distant from said first and second planes, i.e. a plane extending from left to right and out of the paper viewing FIG. 2. These degrees of symmetry ensure that the spacer 2 can only be positioned on two bolts in a correct orientation since turning the spacer 2 round, or over, or both results in the spacer 2 presenting the same appearance.

In one way of assembling a track-adjustable wheel using the spacer 2 and other similar spacers, the rim of the wheel is placed horizontally, the spacers 2 are positioned on the upper surface of the ring of the rim of the wheel so that the passages 24 thereof are each aligned with adjacent bolt-receiving passages in the ring. For example, in the case where there are eight bolt-receiving passages in the ring, four spacers 2 would be used, the spacers being distributed circumferentially around the wheel. It will be noted, that this positioning of the spacers 2 ensures that the orientation of both spacing portions 4 and 6 of each spacer is correct, this being ensured by the joining portions 22. Next, the disc is positioned on top of the spacers 2 so that bolt-receiving passages in the disc are aligned with the passages 24. Bolts are then inserted into the passages in the disc and ring and the passages 24. It will be noted that, if the bolts can be inserted into these passages, it is ensured that the correct orientation of the spacing portions 4 and 6 is not lost.

We claim:

1. A spacer for use in spacing a disc of a track-adjustable wheel from attachment means of a rim of the wheel to which the disc is bolted, the spacer comprising a first spacing portion, a second spacing portion, and a rigid joining portion rigidly joined to both spacing portions and serving to retain the spacing portions at a constant distance and orientation with respect to each other, each spacing portion having a bolt-receiving passage therethrough and each spacing portion having a first bearing surface which extends around a mouth at one end of the passage and a second bearing surface which extends around a mouth at the opposite end of the passage, wherein the first bearing surfaces of both spacing portions lie in a first plane, the second bearing surfaces of both spacing portions lie in a second plane, and the first and second planes are parallel to one another.

2. A spacer according to claim 1, wherein a side surface of each spacing portion is shaped to conform to a surface of the rim.

3. A spacer according to claim 1, wherein a side surface of each spacing portion extends generally parallel to a tangent of the rim at a point adjacent to the spacing portion when the spacer is in position.

4. A spacer according to claim 2, wherein at least one bearing surface of the spacing portion is joined to the side surface by an inclined surface.

5. A spacer according to claim 3, wherein at least one bearing surface of the spacing portion is joined to the side surface by an inclined surface.

6. A spacer according to claim 1, wherein the spacer is symmetrical about a plane passing longitudinally through the centre of both passages.

7. A spacer according to claim 1, wherein the spacer is symmetrical about a plane extending normally to said first and second planes equi-distant from the two spacing portions.

8. A spacer according to claim 6, wherein the spacer is symmetrical about a plane extending normally to said first and second planes equi-distant from the two spacing portions.

9. A spacer according to claim 1, wherein the spacer is symmetrical about a plane extending parallel to and equi-distant from said first and second planes.

10. A spacer according to claim 8, wherein the spacer is symmetrical about a plane extending parallel to and equi-distant from said first and second planes.

* * * * *